United States Patent
Armstrong et al.

(10) Patent No.: US 8,161,995 B2
(45) Date of Patent: Apr. 24, 2012

(54) WATER DIVERTER VALVE AND RELATED DISHWASHER

(75) Inventors: James Lee Armstrong, Louisville, KY (US); Stephen Froelicher, Shepherdsville, KY (US); Joel Charles Boyer, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/986,427

(22) Filed: Jan. 7, 2011

(65) Prior Publication Data

US 2012/0048313 A1    Mar. 1, 2012

(51) Int. Cl.
*G05D 11/00* (2006.01)

(52) U.S. Cl. ............... 137/119.03; 134/56 D; 134/57 D; 137/119.04; 137/119.06; 137/864

(58) Field of Classification Search ............... 134/56 D, 134/57 D; 137/119.03, 119.04, 119.06, 484.2, 137/497–499, 527, 527.8, 625, 625.12, 625.13, 137/625.18, 624.44, 627.5, 862, 864, 883, 137/615

See application file for complete search history.

(56) References Cited

U.S. PATENT DOCUMENTS

| 2,024,548 | A | * | 12/1935 | Clemens | 137/112 |
|---|---|---|---|---|---|
| 2,750,960 | A | * | 6/1956 | Hansen et al. | 137/864 |
| 2,918,927 | A | * | 12/1959 | Clearman | 134/200 |
| 4,029,119 | A | * | 6/1977 | Klieves | 137/119.03 |
| 4,070,239 | A | * | 1/1978 | Bevilacqua | 376/245 |
| 4,531,549 | A | * | 7/1985 | Fontenot | 137/864 |
| 4,741,353 | A | * | 5/1988 | Milocco | 137/119.03 |
| 5,062,448 | A | * | 11/1991 | Hilsenbeck et al. | 137/498 |
| 5,112,567 | A | * | 5/1992 | Feurgarg | 376/245 |
| 5,899,433 | A | | 5/1999 | Kim et al. | |
| 6,050,286 | A | * | 4/2000 | Kruer et al. | 137/119.03 |
| 6,095,189 | A | * | 8/2000 | Ben-Shalom | 137/606 |
| 6,705,330 | B1 | | 3/2004 | Favret | |
| 6,997,196 | B2 | * | 2/2006 | Eiermann | 134/105 |
| 7,100,623 | B2 | | 9/2006 | Assmann et al. | |
| 7,237,563 | B2 | | 7/2007 | Han et al. | |
| 7,284,565 | B2 | * | 10/2007 | Sebor | 137/114 |
| 7,337,790 | B2 | | 3/2008 | Ha | |
| 7,467,636 | B2 | | 12/2008 | Welch | |
| 7,614,409 | B2 | | 11/2009 | Han et al. | |
| 7,644,718 | B2 | | 1/2010 | Jeong et al. | |
| 2003/0051759 | A1 | * | 3/2003 | Schmidt et al. | 137/862 |
| 2004/0103926 | A1 | | 6/2004 | Ha | |
| 2004/0173249 | A1 | | 9/2004 | Assmann et al. | |

(Continued)

*Primary Examiner* — Michael Barr
*Assistant Examiner* — Jason Ko
(74) *Attorney, Agent, or Firm* — Dority & Manning, P.A.

(57) ABSTRACT

Gravity and flow operated diverter valves are disclosed for diverting liquid flow from one source to either of two output destinations, the valves including a housing defining an inlet opening through a base wall, a first outlet opening through a first upper wall and a second outlet opening through a second upper wall. The housing is operable in a configuration with the base wall arranged vertically beneath the first and second upper walls. A valve member has a first end, a second end, and a central portion, the valve member being movably suspended within the housing by the first end when no liquid is flowing into the inlet opening. The valve member is pivotable in a first direction to seal the first outlet opening and pivotable in a second direction to seal the second outlet opening. The housing interior and the valve member are cooperatively configured so that on successive liquid flows into the inlet opening the valve member automatically and alternatingly seals the first outlet opening and the second outlet opening. Related dishwasher designs are also disclosed.

14 Claims, 6 Drawing Sheets

U.S. PATENT DOCUMENTS

| | | |
|---|---|---|
| 2005/0022849 A1 | 2/2005 | Park et al. |
| 2006/0054198 A1 | 3/2006 | Choi et al. |
| 2006/0249181 A1* | 11/2006 | Wetzel et al. ........... 134/25.1 |
| 2007/0119488 A1 | 5/2007 | Kwon |
| 2008/0169026 A1 | 7/2008 | Sanchez |
| 2009/0139553 A1 | 6/2009 | Park |
| 2010/0043825 A1* | 2/2010 | Bertsch et al. ........... 134/18 |

* cited by examiner

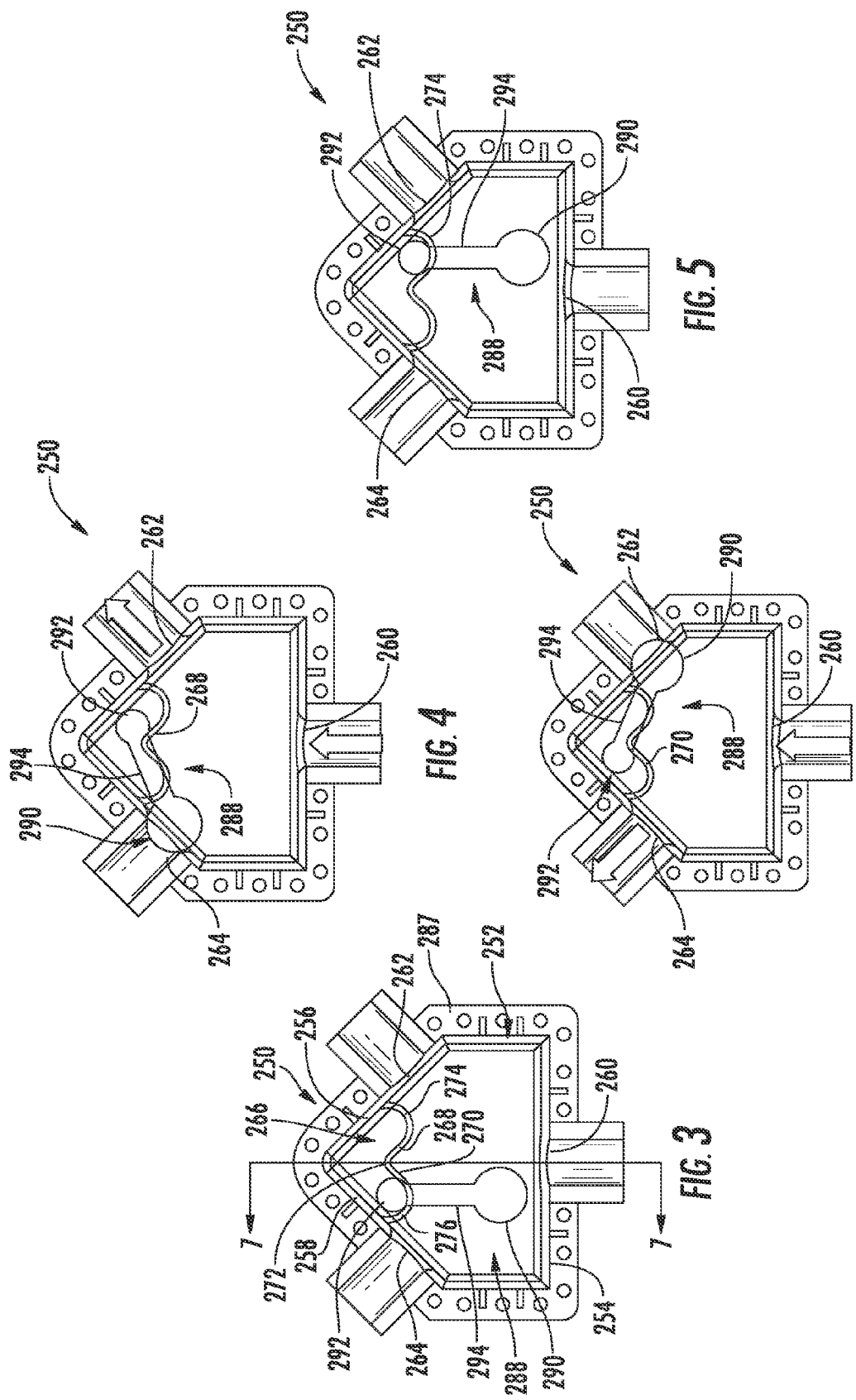

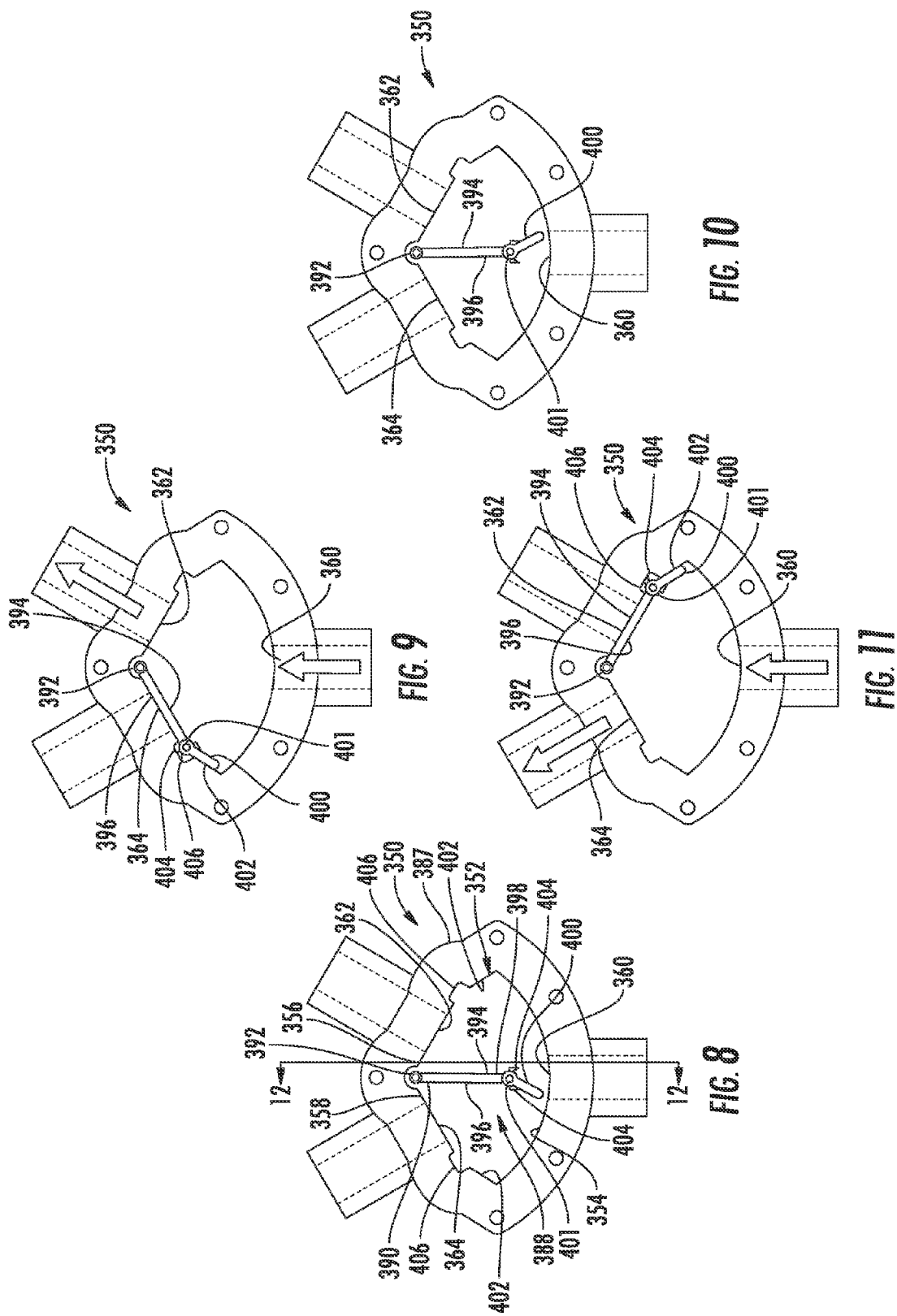

WATER DIVERTER VALVE AND RELATED DISHWASHER

FIELD OF THE INVENTION

The present disclosure relates generally to water diverter valves which can be used in a dishwasher.

BACKGROUND OF THE INVENTION

Dishwashers of various types have been proposed wherein items are placed in a wash chamber which is filled and emptied according to desired wash sequences. Recently, dishwasher manufacturers have focused even more on efficiency in implementing new designs. Thus, an amount of electricity, an amount of detergent, and an amount of water used are all monitored in an attempt to provide efficient and environmentally sensitive machines.

Many dishwashers have more than one outlet within them for spraying water within the wash chamber. For example, dishwashers typically have an upper rack and a lower dish rack. Such dishwashers may have a multiple rotating spray arms located at a lower level, a midlevel (between dish racks), and an upper level that spray during a wash or rinse cycle. Some dishwashers have two such sprayers and some have more.

To reduce the amount of water used in such multiple sprayer dishwashers, it is desirable to alternate spraying between the multiple spray arm assemblies. Doing so requires a smaller amount of water in the wash chamber because only half of the spray system need be actively filled with water at a time. Conventional devices accomplish such alternation with solenoid valves to divert water from one spray assembly or the other. This adds to cost and complexity of the device. Other devices accomplish such switching with a pump driven column of water moving a floating ball or other diverter element. However, such solution requires extra water and has higher pumping requirements.

Accordingly, other designs for alternating water flow between multiple outlets within a wash chamber and related dishwashers including those addressing one or more drawbacks of conventional devices and dishwashers would be welcome.

BRIEF DESCRIPTION OF THE INVENTION

Aspects and advantages of the invention will be set forth in part in the following description, or may be obvious from the description, or may be learned through practice of the invention.

According to certain aspects of the present disclosure, gravity and flow operated diverter valves are disclosed for diverting liquid flow from one source to either of two output destinations, the valves including a housing defining outer walls including a base wall, a first upper wall and a second upper wall at an angle to the first upper wall. There is an inlet opening through the base wall, a first outlet opening through the first upper wall and a second outlet opening through the second upper wall. The housing is operable in a configuration with the base wall arranged vertically beneath the first and second upper walls. A valve member has a first end, a second end, and a central portion, the valve member being movably suspended within the housing by the first end when no liquid is flowing into the inlet opening. The valve member is pivotable in a first direction to seal the first outlet opening and pivotable in a second direction to seal the second outlet opening. The housing interior and the valve member are cooperatively configured so that on successive liquid flows into the inlet opening the valve member automatically and alternatingly seals the first outlet opening and the second outlet opening. Various options and modifications are possible.

According to certain other aspects of the disclosure, a dishwasher is disclosed includes a cabinet, a wash chamber within the cabinet, a first spray device for spraying liquid into the wash chamber and a second spray device for spraying liquid into the wash chamber. A circulation pump assembly pumps water from a sump area of wash chamber to either the first spray device or the second spray device. A valve includes a housing defining outer walls including a base wall, a first upper wall and a second upper wall at an angle to the first upper wall. There is an inlet opening through the base wall in communication with an outlet of the pump assembly, a first outlet opening through the first upper wall in communication with an inlet of the first spray device, and a second outlet opening through the second upper wall in communication with an inlet of the second spray device. The housing is mounted in the cabinet with the base wall arranged vertically beneath the first and second upper walls. A valve member has a first end, a second end, and a central portion, the valve member being movably suspended within the housing by the first end when the circulation pump assembly is not pumping. The valve member is pivotable in a first direction to seal the first outlet opening and pivotable in a second direction to seal the second outlet opening. The housing interior and the valve member are cooperatively configured so that as the circulation pump assembly is cycled on and off the valve member automatically and alternatingly seals the first outlet opening and the second outlet opening. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 provides a schematic front view of one valve housing interior suitable for use with the dishwasher of FIG. 1 in a first, no flow condition;

FIG. 4 provides a schematic front view of the valve housing interior in a first flow condition;

FIG. 5 provides a schematic front view of the valve housing interior in a second, no flow condition;

FIG. 6 provides a schematic front view of the valve housing interior in a second flow condition;

FIG. 8 provides a schematic front view of another valve housing interior suitable for use with the dishwasher of FIG. 1 in a first, no flow condition;

FIG. 9 provides a schematic front view of the valve housing interior of FIG. 8 in a first flow condition;

FIG. 10 provides a schematic front view of the valve housing interior of FIG. 8 in a second, no flow condition;

FIG. 11 provides a schematic front view of the valve housing interior of FIG. 8 in a second flow condition.

DETAILED DESCRIPTION OF THE INVENTION

Figure 1:
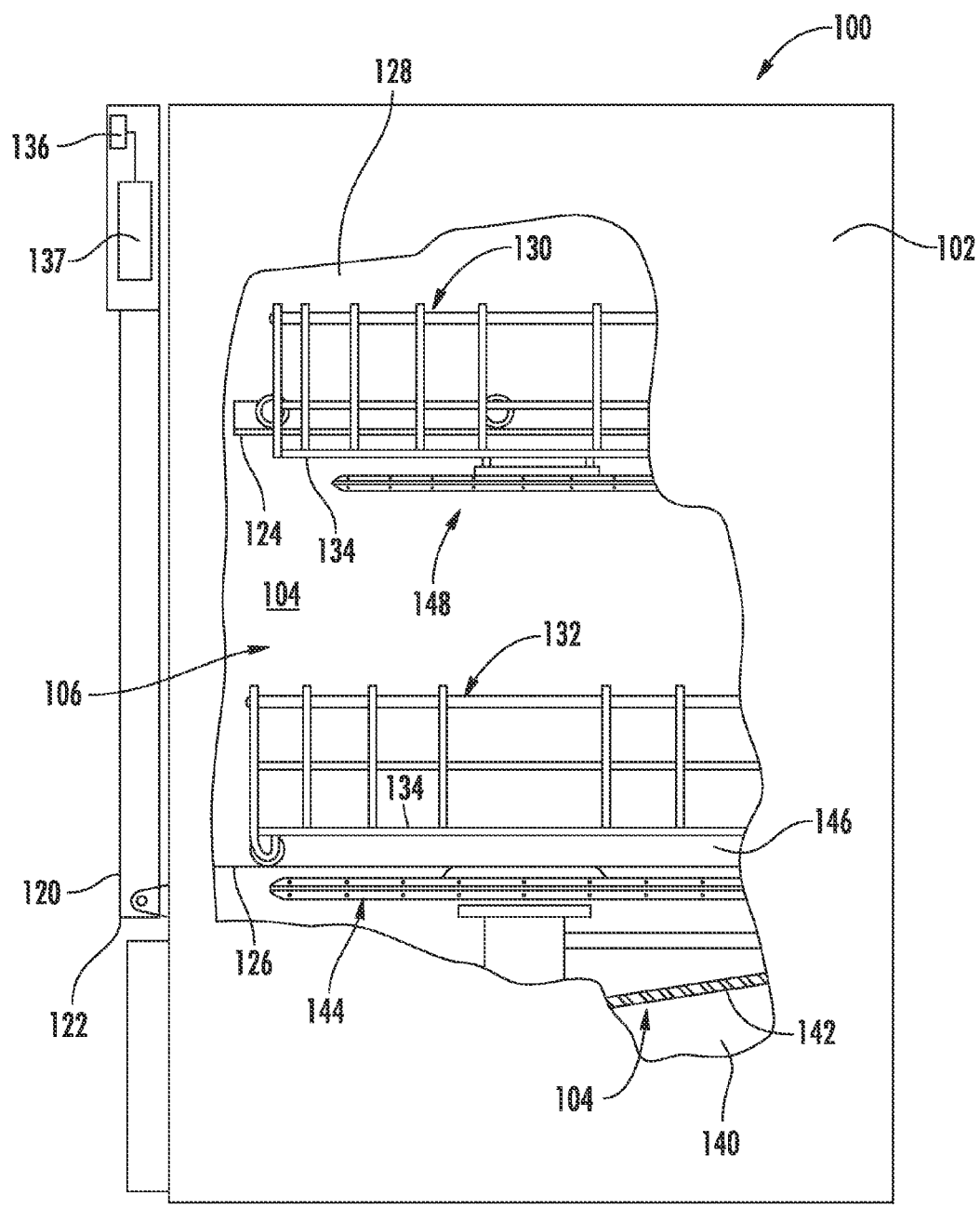
FIG. 1 provides a side partial cut-away view of an exemplary dishwasher that may be configured in accordance with aspects of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As discussed in greater detail below, embodiments of the present disclosure relate to a flow sensing float device that can be used with a dishwasher. FIG. 1 depicts an exemplary domestic dishwasher 100 that may be configured in accordance with aspects of the disclosure. For the particular embodiment of FIG. 1, the dishwasher 100 includes a cabinet 102 having a tub 104 therein that defines a wash chamber 106. The tub 104 includes a front opening (not shown in FIG. 1) and a door 120 hinged at its bottom 122 for movement between a normally closed vertical position (shown in FIG. 1) wherein the wash chamber 106 is sealed shut for washing operation, and a horizontal open position for loading and unloading of articles from the dishwasher. Upper and lower guide rails 124, 126 are mounted on tub side walls 128 and accommodate upper and lower roller-equipped racks 130, 132, respectively. Each of the upper and lower racks 130, 132 is fabricated into lattice structures including a plurality of elongate members 134, and each rack 130, 132 is adapted for movement between an extended loading position (not shown) in which the rack is substantially positioned outside the wash chamber 106, and a retracted position (shown in FIG. 1) in which the rack is located inside the wash chamber 106. A silverware basket (not shown) may be removably attached to the lower rack 132 for placement of silverware, utensils, and the like, that are too small to be accommodated by the upper and lower racks 130, 132.

The dishwasher 100 further includes a lower spray-arm-assembly 144 that is rotatably mounted within a lower region 146 of the wash chamber 106 and above a tub sump portion 142 so as to rotate in relatively close proximity to the lower rack 132. A mid-level spray-arm assembly 148 is located in an upper region of the wash chamber 106 and may be located in close proximity to upper rack 130. Additionally, an upper spray arm assembly (not shown) may be located above the upper rack 130.

The lower and mid-level spray-arm assemblies 144, 148 and the upper spray arm assembly are fed by a fluid circulation assembly for circulating water and dishwasher fluid in the tub 104. The fluid circulation assembly may be located in a machinery compartment 140 located below the bottom sump portion 142 of the tub 104, as generally recognized in the art. Each spray-arm assembly includes an arrangement of discharge ports or orifices for directing washing liquid onto dishes or other articles located in the upper and lower racks 130, 132, respectively. The arrangement of the discharge ports in at least the lower spray-arm assembly 144 provides a rotational force by virtue of washing fluid flowing through the discharge ports. The resultant rotation of the lower spray-arm assembly 144 provides coverage of dishes and other dishwasher contents with a washing spray.

The dishwasher 100 is further equipped with a controller 137 to regulate operation of the dishwasher 100. The controller may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area of door 120 as shown. In such an embodiment, input/output ("I/O") signals may be routed between the control system and various operational components of dishwasher 100 along wiring harnesses that may be routed through the bottom 122 of door 120. Typically, the controller 137 includes a user interface panel 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

It should be appreciated that the invention is not limited to any particular style, model, or other configuration of dishwasher, and that the embodiment depicted in FIG. 1 is for illustrative purposes only. For example, instead of the racks 130, 132 depicted in FIG. 1, the dishwasher 100 may be of a known configuration that utilizes drawers that pull out from the cabinet and are accessible from the top for loading and unloading of articles.

Figure 2:
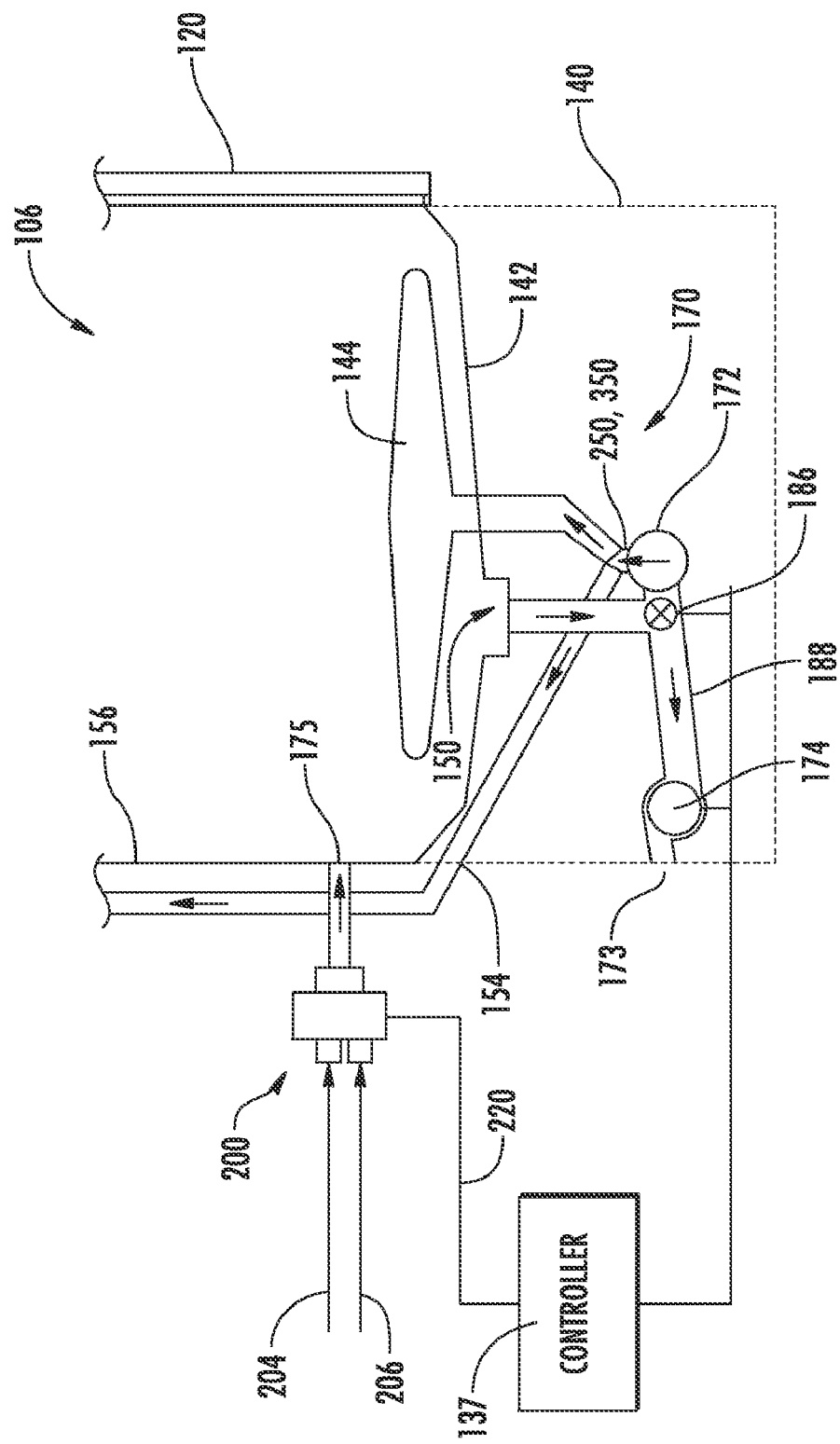
FIG. 2 is a schematic view of one possible fluid system the dishwasher of FIG. 1.

FIG. 2 schematically illustrates an embodiment of a fluid circulation assembly 170 configured below the wash chamber 106. Although one embodiment of a fluid circulation assembly that is operable to perform in accordance with aspects of the disclosure is shown, it is contemplated that other fluid circulation assembly configurations may similarly be utilized without departing from the spirit and scope of the invention. The fluid circulation assembly 170 includes a circulation pump assembly 172 and a drain pump assembly 174, both in fluid communication with the sump 150. Additionally, the drain pump assembly 174 is in fluid communication with an external drain 173 to discharge used wash liquid. Further, the circulation pump assembly 172 is in fluid communication with lower spray arm assembly 144 and conduit 154 which extends to a back wall 156 of wash chamber 106, and upward along the back wall 156 for feeding wash liquid to the mid-level spray arm assembly 148 (FIG. 1) and the upper spray arm assembly. A diverter valve 250, 350 is located between circulation pump assembly output and the conduits to the different spray arm assemblies 144 and 148 and diverts flow one way or the other, as described below. This configuration also applies to a drawer-type of dishwasher, as mentioned above.

As wash liquid is pumped through either the lower spray arm assembly 144 or the mid-level spray arm assembly 148 and the upper spray arm assembly (not shown), washing sprays are generated in the wash chamber 106, and wash liquid collects in the sump 150. The sump 150 may include a cover to prevent larger objects from entering the sump 150, such as a piece of silverware or another dishwasher item that is dropped beneath lower rack 132. A coarse filter and a fine filter (not shown) may be located adjacent the sump 150 to filter wash liquid for sediment and particles of predetermined sizes before flowing into the sump 150. Furthermore, a turbidity sensor may be coupled to the sump 150 and used to sense a level of sediment in the sump 150 and to initiate a sump purge cycle where the contents or a fractional volume of the contents of the sump 150 are discharged when a turbidity level in the sump 150 approaches a predetermined threshold. The sump 150 is filled with water through an inlet port 175 which outlets into wash chamber 106.

As shown, a drain valve 186 is established in flow communication with the sump 150 and opens or closes flow communication between the sump 150 and a drain pump inlet 188. The drain pump assembly 174 is in flow communication with the drain pump inlet 188 and may include an electric motor for pumping fluid at the inlet 188 to an external drain system via drain 173. In one embodiment, when the drain pump is energized, a negative pressure is created in the drain pump inlet 188 and the drain valve 186 is opened, allowing fluid in the sump 150 to flow into the fluid pump inlet 188 and be discharged from fluid circulation assembly 170 via the external drain 173. Alternatively, pump assemblies 172 and 174 may be connected directly to the side or the bottom of sump 150, and the pump assemblies may each include their own valving replacing drain valve 186. Other fluid circulation systems are possible as well, drawings fluid from sump 150 and providing as desired within wash chamber 106 or draining out of washing machine 100.

Referring to FIG. 2, a water supply 200 may be configured with the inlet port 175 for supplying wash liquid to the wash chamber 106. The water supply 200 may provide hot water only, cold water only, or either selectively as desired. As depicted, water supply 200 has a hot water inlet 204 that receives hot water from an external source, such as a hot water heater and a cold water input 206 that receives cold water from an external source. It should be understood that the term "water supply" is used herein to encompass any manner or combination of valves, lines or tubing, housing, and the like, and may simply comprise a conventional hot or cold water connection.

FIG. 3 shows one example of a diverter valve according to certain aspects of the disclosure in a first no-flow condition. As shown, valve 250 has a housing 252 with outer walls that include a base wall 254, a first upper wall 256 and a second upper wall 258 at an angle (about a right angle, as shown) to the first upper wall. An inlet opening 260 extends through base wall 254, a first outlet opening 262 extends through first upper wall 256, and a second outlet opening 264 extends through second upper wall 258. Valve 250 is operable in a configuration with base wall 254 arranged vertically beneath first and second upper walls 256 and 258, as will be described below.

Figure 7:
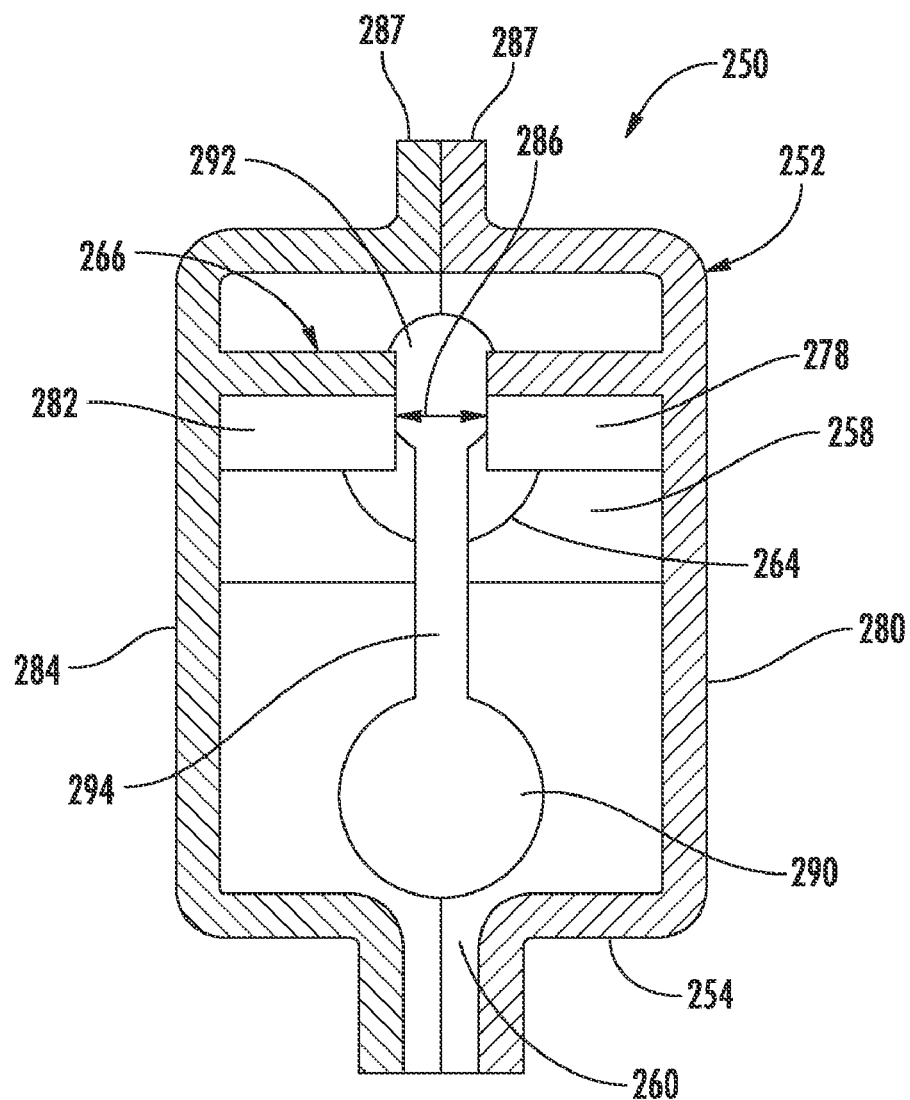
FIG. 7 provides a schematic cross-sectional view of the valve housing taken along line 7-7 in FIG. 3.
Figure 12:
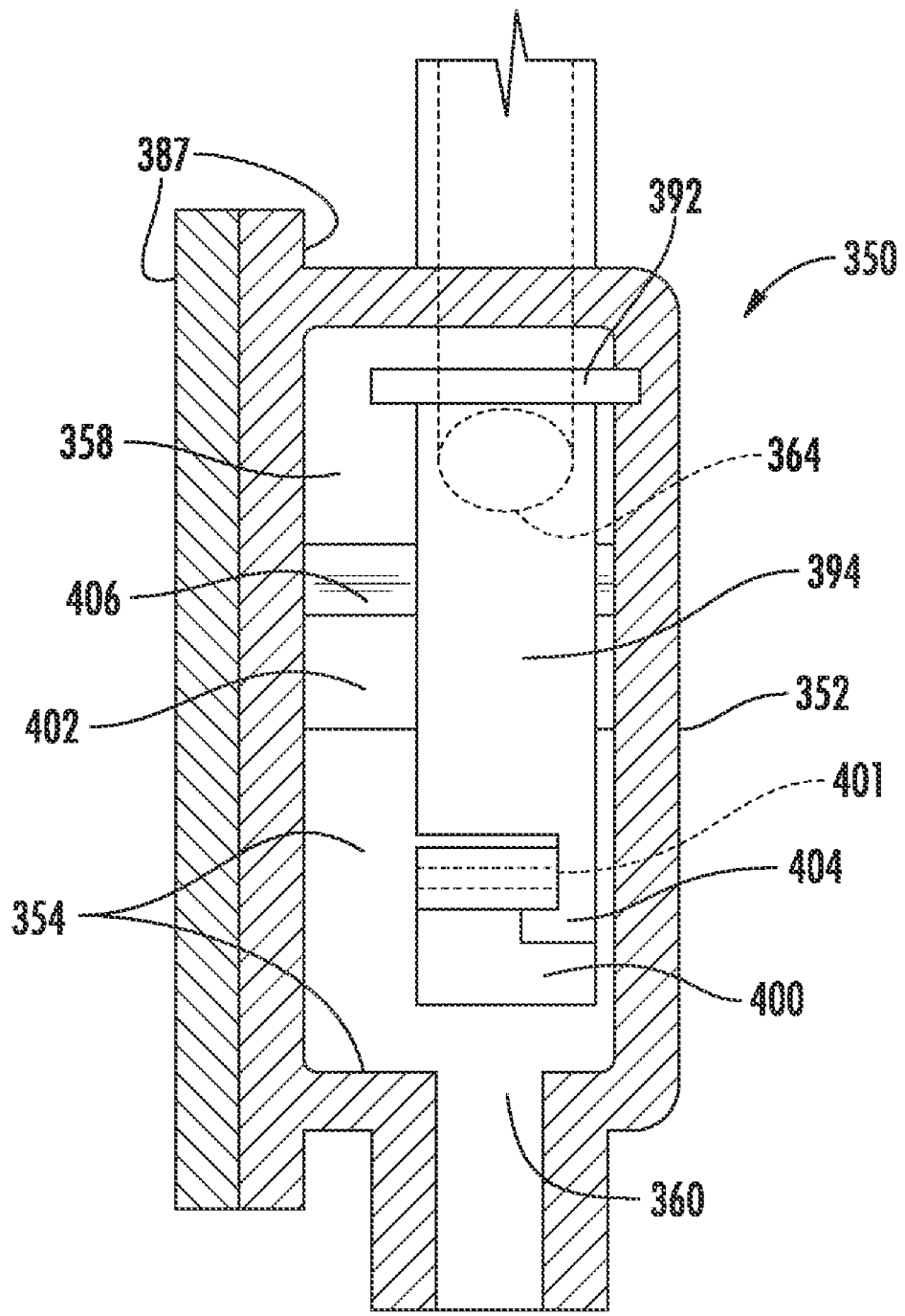
FIG. 12 provides a schematic cross-sectional view of the valve housing taken along line 12-12 in FIG. 8.

A track 266 is defined within housing 252 adjacent the intersection of the first and second upper walls 256,258. Track 266 has a first arm 268 and a second arm 270 both extending downward at about a right angle from a central peak 272 where first and second upper walls 256,258 meet. The first arm 268 terminates at a first arm end 274 and the second arm 270 terminates at a second arm end 276. Track 266 has two symmetrical parts, one part 278 attached to a rear wall 280 of housing 252 and a second identical part 282 attached to a front wall 284 of housing 252 (see FIG. 7). The track parts 278,282 are spaced apart by a distance 286 along their lengths. Flanges 287 can be used to connect housing parts 280 and 284.

A valve member 288 is movably mounted within housing 252. Valve member 288 includes a first ball 290 sized to seal either of the first or second outlet openings 262,264, a follower in the shape of a second ball 292 sized to move along track 266 between first and second arm ends 274,276, and a central portion 294 connecting the first and second balls. Essentially, valve member 288 is barbell-shaped. As shown, balls 290,292 have different diameters, but they may have the same diameters or have their relative sizes switched if desired. Further, follower need not be in the shape of ball 292, and could have other curved shapes, could be cylindrical, etc., as long as the follower can travel readily along track 266 from end 274 to end 276.

FIGS. 3 to 6 show the cycling of valve member 288 to alternatingly connect outlets 262 and 264 with inlet 260 as the circulation pump assembly is turned on and off. FIG. 3 shows an initial, no flow position. Follower 292 is at end 276 of track arm 270 and ball 290 hangs down. Once flow starts through opening 260, rising liquid pushes valve member 288 upward. As liquid rises and any air evacuates, valve member 288 moves upward with follower 292 rising along track 266 and first ball member 290 being moved toward second opening 264 by liquid passing through the opening. Since ball member 290 is to one side of housing 252, the ball member is moved toward the outlet opening on that side, namely opening 264. Eventually, valve member 288 reaches the position of FIG. 4, with ball 290 sealing a corresponding seat of opening 264. Accordingly, at this point all flow from inlet 260 goes out opening 262 and not opening 264. Note that follower 292 is now to the right side of track 266 in arm 268 (due in part to the length of central portion 294).

When flow is shut off, valve member 288 falls, with follower 292 falling to end 274 of arm 268 and ball 290 hanging below as shown in FIG. 5. Basically, valve member 288 has simply changed sides within housing 252 as compared to FIG. 3. When flow enters again as in FIG. 6, valve member 288 again rises and this time ball 290 seals opening 262. Turning off the flow again results in valve member 288 returning to the position of FIG. 3, and the cycle can start again.

FIG. 8 shows an alternate diverter valve according to certain aspects of the disclosure. As shown, valve 350 has a housing 352 with outer walls that include a base wall 354, a first upper wall 356 and a second upper wall 358 at an angle to the first upper wall. An inlet opening 360 extends through base wall 354, a first outlet opening 362 extends through first upper wall 356, and a second outlet opening 364 extends through second upper wall 358. As above, valve 350 is operable with base wall 354 arranged vertically beneath first and second upper walls 356 and 358. Flanges 387 can be used to connect housing parts together.

A valve member 388 is movably mounted within housing 352. Valve member 388 includes a first end 390 having an axle 392 pivotably attached to a hole in (but not through) housing 352. Valve member 388 has a central portion with a flat sealing surface 394 on a first side for sealing first outlet opening 362 and a flat sealing surface 396 on a second side for sealing a second outlet opening 364.

Valve member 388 has a second end 398 with a pivotable end arm 400 attached to an axle 401 at the second end. End arm 400 is movable between a first position (see FIG. 10) directed toward first outlet opening 362 and a second position (see FIG. 8) directed to second outlet opening 364. When liquid flow is introduced into inlet opening 360 by activating the circulation pump assembly, end arm 400 directs valve member 388 to move toward the one of the first or second outlet openings 362,364 toward which the pivotable end arm is pointed. In other words, as flow comes through inlet opening 360, it initially impinges on arm 400 moving the whole valve member 388 to the side—at which point the flow starts impinging on the sealing surface 394 or 396 now facing opening 360, thereby allowing the flow to rapidly push the valve member to seal outlet opening 362 or 364.

A camming surface 402 is located adjacent each outlet opening 362,364. Camming surfaces 402 contact and move pivotable end arm 400 from the first or second position of the arm 400 to the other when valve member 388 moves fully to seal the respective first or second outlet openings 362,364. As shown, camming surfaces 402 are placed so that arm 400 will contact the camming surfaces and pivot about axle 401 when valve member 388 is sealing. Retainers 404 may be provided on either side of arm 400 at second end 398 of valve member 388 to define a range of motion for arm 400. Recesses 406 may be provided between openings 362,364 and camming surfaces 402 so that retainers 404 and the thicker part of arm 400 around axle 401 do not prevent valve member 388 from moving fully against openings 362,364 to seal them.

FIGS. 8-11 show the cycling of valve member 388 to alternatingly connect outlets 362 and 364 with inlet 360 as above. FIG. 8 shows an initial, no flow position. Arm 400 points toward second outlet opening 364. Once flow starts through opening 360, rising liquid hits arm 400 and pivots valve member 388 to the left until it closes second opening 364 with sealing surface 396. Near the end of travel, arm 400 hits camming surface 402 and pivots to the position shown in FIG. 9. The leftward (as shown) retainer 404 is in recess 406. Accordingly, at this point all flow from inlet 360 goes out opening 362 and not opening 364.

When flow is shut off, valve member 388 pivots down, with arm 400 pointing toward opening 362, on the right as shown in FIG. 10. Valve member 388 is now in the same position as in FIG. 8, except that arm 400 is pointed in the opposite direction. When flow enters again as in FIG. 11, valve member 388 again pivots upward to the right and seals opening 362 with surface 394. Arm 400 hits the other camming surface 402 and pivots back to the left. Turning off the flow again results in valve member 388 pivoting back down, with arm 400 pointing to the left, returning to the position of FIG. 8, and the cycle can start again.

Parts of valve members 288, 388 may be plastic, metal, rubber, etc. if desired, but should have a density and weight chosen in view of the desired flow needed for the spray devices used so that that the valve member reliably moves upward and seals when flow occurs. Accordingly, valves 250, 350 provide inexpensive and reliable diverters. No electronics are required, and all moving parts are essentially self-actuated by the circulation pump assembly. Mounting valves 250, 350 at or near the circulation pump, beneath the sump, etc., allows a lesser amount of water to have to be cycled through the system and the different spray elements within the wash chamber to achieve a given desired cycle. No ball-driven water column is needed, saving water and complexity. Such valve device can be used not only within a dishwasher but also within other devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gravity and flow operated diverter valve for diverting liquid flow from one source to either of two output destinations, the valve comprising:

a housing defining outer walls including a base wall, a first upper wall and a second upper wall at an angle to the first upper wall, an inlet opening through the base wall, a first outlet opening through the first upper wall and a second outlet opening through the second upper wall, the housing operable in a configuration with the base wall arranged vertically beneath the first and second upper walls;

a track extending between the first upper wall and the second upper wall, the track having a central peak and recesses defined on opposite sides of the central peak; and a valve member having a first end with a follower defined thereon, a second end, and a central portion, the valve member being movably suspended within the housing by the follower on the first end residing in either of the recesses when no liquid is flowing into the inlet opening, the second end of the valve member hanging within the housing below the track and being pivotable in a first direction to seal the first outlet opening while the follower resides in one of the recesses and pivotable in a second direction opposite the first direction to seal the second outlet opening while the follower resides in the other one of the recesses, the housing interior and the valve member being cooperatively configured so that on successive liquid flows into the inlet opening the second end of the valve member automatically and alternatingly seals the first outlet opening and the second outlet opening.

2. The valve of claim 1, wherein the housing defines a track adjacent the intersection of the first and second upper walls, the recesses in the track are defined by having a first arm and a second arm both extending downward from the central peak where the first and second upper walls meet, the first arm terminating at a first arm end and the second arm terminating at a second arm end, the first end of the valve member including a follower sized to move back and forth along the track between the first and second arm ends.

3. The valve of claim 2, wherein the second end of the valve member includes a first ball sized to seal either of the first or second outlet openings, a central portion of the valve member connecting the first ball and the follower.

4. The valve of claim 3, wherein the central portion has a length so that when the first ball seals one of the first or second outlet openings the follower is in the second or first arm of the track, respectively, and the first ball member falls to hang below the follower with the follower at either of the second or first arm ends, respectively, when liquid flow through the inlet opening ceases.

5. The valve of claim 3, wherein the central portion of the valve member and arms of the track are sized so as to alternate which of the first or second outlet openings are sealed by the first ball as flow into the housing via the inlet opening is cycled on and off.

6. The valve of claim 1, wherein the first and second arms of the track meet at about a right angle at the central peak.

7. The valve of claim 6, wherein the first and second upper walls are angled at about 45 degrees relative to the base wall.

8. The valve of claim 1, wherein the follower is in the shape of a second ball.

9. A dishwasher comprising:
a cabinet;
a wash chamber within the cabinet;
a first spray device for spraying liquid into the wash chamber;
a second spray device for spraying liquid into the wash chamber;
a circulation pump assembly for pumping water from a sump area of wash chamber to either the first spray device or the second spray device; and
a valve including:
a housing defining outer walls including a base wall, a first upper wall and a second upper wall at an angle to the first upper wall, an inlet opening through the base wall in communication with an outlet of the circulation pump assembly, a first outlet opening through the first upper wall in communication with an inlet of the first spray device, and a second outlet opening through the second upper wall in communication with an inlet of the second spray device, the housing mounted in the cabinet with the base wall arranged vertically beneath the first and second upper walls;
a track extending between the first upper wall and the second upper wall, the track having a central peak and recesses defined on opposite sides of the central peak; and
a valve member having a first end with a follower defined thereon, a second end, and a central portion, the valve member being movably suspended within the housing by the follower on the first end residing in either of the recesses when no liquid is flowing into the inlet opening, the second end of the valve member hanging within the housing below the track and being pivotable in a first direction to seal the first outlet opening while the follower resides in one of the recesses and pivotable in a second direction opposite the first direction to seal the second outlet opening while the follower resides in the other one of the recesses, the housing interior and the valve member being cooperatively configured so that on successive liquid flows into the inlet opening the second end of the valve member automatically and alternatingly seals the first outlet opening and the second outlet opening.

10. The dishwasher of claim 9, wherein the housing defines a track adjacent the intersection of the first and second upper walls, the recesses in the track are defined by having a first arm and a second arm both extending downward from a the central peak where the first and second upper walls meet, the first arm terminating at a first arm end and the second arm terminating at a second arm end.

11. The dishwasher of claim 10, wherein the second end of the valve member includes a first ball sized to seal either of the first or second outlet openings, a central portion of the valve member connecting the first ball and the follower.

12. The dishwasher of claim 11, wherein the central portion has a length so that when the first ball seals one of the first or second outlet openings the follower is in the second or first arm of the track, respectively, and the first ball member falls to hang below the follower with the follower at either of the second or first arm ends, respectively, when the circulation pump assembly is not pumping liquid into the housing.

13. The dishwasher of claim 9, wherein the valve housing is attached to the circulation pump assembly.

14. The dishwasher of claim 9, wherein the valve housing is located within the cabinet so that the first and second outlet openings are at a height below that of the top of the sump area.

* * * * *